US 11,319,817 B2

(12) United States Patent
Propheter-Hinckley

(10) Patent No.: US 11,319,817 B2
(45) Date of Patent: May 3, 2022

(54) AIRFOIL WITH PANEL AND SIDE EDGE COOLING

(71) Applicant: United Technologies Corporation, Farmington, CT (US)

(72) Inventor: Tracy A. Propheter-Hinckley, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 95 days.

(21) Appl. No.: 16/821,169

(22) Filed: Mar. 17, 2020

(65) Prior Publication Data

US 2020/0224538 A1   Jul. 16, 2020

Related U.S. Application Data

(63) Continuation of application No. 15/354,056, filed on Nov. 17, 2016, now Pat. No. 10,598,029.

(51) Int. Cl.
*F01D 5/18* (2006.01)
*F01D 9/04* (2006.01)
(Continued)

(52) U.S. Cl.
CPC .............. *F01D 5/187* (2013.01); *F01D 9/041* (2013.01); *F02C 7/18* (2013.01); *F04D 29/388* (2013.01);
(Continued)

(58) Field of Classification Search
CPC ........ F01D 5/187; F01D 9/041; F04D 29/388; F04D 29/541; F04D 29/582;
(Continued)

(56) References Cited

U.S. PATENT DOCUMENTS 3,215,511 A   11/1965   Chisholm
4,137,008 A   1/1979   Grant et al.
(Continued)

FOREIGN PATENT DOCUMENTS

EP   0764764   3/1997
EP   1764481   3/2007
(Continued)

OTHER PUBLICATIONS

U.S. Appl. No. 13/429,474, filed Mar. 26, 2012.
(Continued)

*Primary Examiner* — Aaron R Eastman
(74) *Attorney, Agent, or Firm* — Carlson, Gaskey & Olds, P.C.

(57) ABSTRACT

An airfoil includes a core structure that defines a cooling passage and first and second panels that are attached with the core structure. Each of the first and second panels includes an exterior gas path side, an opposed interior side, and a side edge. The side edge has a bearing portion that defines a bearing surface. The bearing surface of the first panel abuts the bearing surface of the second panel at a bearing interface. There are channels in the bearing portion of the first panel. Each of the channels has a first end that opens to the cooling passage and a second end that opens to the exterior gas path side at one of the side edges. Each of the channels is defined on a side by the bearing surface of the second panel.

10 Claims, 6 Drawing Sheets

(51) Int. Cl.
*F04D 29/54* (2006.01)
*F04D 29/38* (2006.01)
*F04D 29/58* (2006.01)
*F02C 7/18* (2006.01)

(52) U.S. Cl.
CPC ......... *F04D 29/541* (2013.01); *F04D 29/582* (2013.01); *F05D 2220/32* (2013.01); *F05D 2240/12* (2013.01); *F05D 2240/30* (2013.01); *F05D 2240/81* (2013.01); *F05D 2260/202* (2013.01); *Y02T 50/60* (2013.01)

(58) Field of Classification Search
CPC ............. F05D 2220/32; F05D 2240/12; F05D 2240/30; F05D 2240/81; F05D 2260/202; F02C 7/18; Y02T 50/60
See application file for complete search history.

(56) References Cited

U.S. PATENT DOCUMENTS

| | | | |
|---|---|---|---|
| 4,247,259 A | | 1/1981 | Saboe et al. |
| 4,396,349 A | | 8/1983 | Hueber |
| 4,827,587 A | * | 5/1989 | Hall ...................... A61K 31/55 29/527.6 |
| 4,914,794 A | | 4/1990 | Strangman |
| 5,358,379 A | | 10/1994 | Pepperman et al. |
| 5,392,515 A | * | 2/1995 | Auxier .................. B23P 15/04 29/889.721 |
| 5,538,380 A | | 7/1996 | Norton et al. |
| 5,681,616 A | | 10/1997 | Gupta et al. |
| 5,705,231 A | | 1/1998 | Nissley et al. |
| 5,951,892 A | | 9/1999 | Wolfla et al. |
| 6,000,906 A | | 12/1999 | Draskovich |
| 6,102,656 A | | 8/2000 | Nissley et al. |
| 6,224,963 B1 | | 5/2001 | Strangman |
| 6,316,078 B1 | | 11/2001 | Smialek |
| 6,503,574 B1 | | 1/2003 | Skelly et al. |
| 6,514,046 B1 | | 2/2003 | Morrison et al. |
| 6,543,996 B2 | | 4/2003 | Koschier |
| 6,703,137 B2 | | 3/2004 | Subramanian |
| 6,709,230 B2 | | 3/2004 | Morrison et al. |
| 6,846,574 B2 | | 1/2005 | Subramanian |
| 7,104,756 B2 | | 9/2006 | Harding et al. |
| 7,316,539 B2 | | 1/2008 | Campbell |
| 7,326,030 B2 | | 2/2008 | Albrecht et al. |
| 7,435,058 B2 | | 10/2008 | Campbell et al. |
| 7,452,182 B2 | | 11/2008 | Vance et al. |
| 7,520,725 B1 | | 4/2009 | Liang |
| 7,670,116 B1 | | 3/2010 | Wilson, Jr. et al. |
| 7,963,745 B1 | | 6/2011 | Liang |
| 8,079,806 B2 | | 12/2011 | Tholen et al. |
| 8,182,208 B2 | | 5/2012 | Bridges, Jr. et al. |
| 8,197,211 B1 | | 6/2012 | Liang |
| 8,202,043 B2 | | 6/2012 | McCaffrey |
| 8,251,651 B2 | | 8/2012 | Propheter-Hinckley et al. |
| 8,366,392 B1 | | 2/2013 | Laing |
| 8,480,366 B2 | | 7/2013 | Malecki et al. |
| 8,506,243 B2 | | 8/2013 | Strock et al. |
| 8,821,124 B2 | | 9/2014 | Viens et al. |
| 2008/0159850 A1 | | 7/2008 | Tholen et al. |
| 2010/0136258 A1 | | 6/2010 | Strock et al. |
| 2011/0058934 A1 | | 3/2011 | James |
| 2012/0100008 A1 | | 4/2012 | Ahmad |
| 2012/0317984 A1 | | 12/2012 | Dierberger |
| 2016/0090851 A1 | | 3/2016 | Carr et al. |
| 2019/0032493 A1 | * | 1/2019 | Barker .................. F01D 9/042 |

FOREIGN PATENT DOCUMENTS

| | | |
|---|---|---|
| EP | 2105579 | 9/2009 |
| EP | 2540971 | 1/2013 |
| EP | 2853688 | 4/2015 |
| EP | 3106619 | 12/2016 |
| GB | 2272453 | 5/1994 |
| JP | 61066802 | 4/1986 |
| JP | 05321602 | 12/1993 |

OTHER PUBLICATIONS

U.S. Appl. No. 14/659,718, filed Mar. 17, 2015.
U.S. Appl. No. 14/812,668, filed Jul. 29, 2015.
European Search Report for European Patent Application No. 17202358.2 completed Mar. 6, 2018.

* cited by examiner

US 11,319,817 B2

AIRFOIL WITH PANEL AND SIDE EDGE COOLING

CROSS-REFERENCE TO RELATED APPLICATION

This application is a continuation of U.S. patent application Ser. No. 15/354,056 filed Nov. 17, 2016.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An airfoil according to an example of the present disclosure includes a core structure that defines a cooling passage. First and second panels are attached with the core structure. Each of the first and second panels have an exterior gas path side, an opposed interior side, and a side edge. The side edge has a bearing portion that defines a bearing surface. The bearing surface of the first panel abuts the bearing surface of the second panel at a bearing interface. There are channels in the bearing portion of the first panel. Each of the channels has a first end that opens to the cooling passage and a second end that opens to the exterior gas path side at one of the side edges. Each of the channels is defined on a side by the bearing surface of the second panel.

In a further embodiment of any of the foregoing embodiments, the channels are notches.

In a further embodiment of any of the foregoing embodiments, the each of the notches is elongated and sloped.

In a further embodiment of any of the foregoing embodiments, the first and second panels overlap at the bearing interface.

In a further embodiment of any of the foregoing embodiments, the airfoil includes an airfoil section and a platform, and the first and second panels are on the platform.

In a further embodiment of any of the foregoing embodiments, the each of the notches is elongated and sloped.

In a further embodiment of any of the foregoing embodiments, the first and second panels overlap at the bearing interface.

In a further embodiment of any of the foregoing embodiments, at least one of the first or second panels includes a geometric segmented coating section.

In a further embodiment of any of the foregoing embodiments, the each of the notches is elongated and sloped.

In a further embodiment of any of the foregoing embodiments, the channels are notches.

In a further embodiment of any of the foregoing embodiments, the each of the notches is elongated and sloped.

In a further embodiment of any of the foregoing embodiments, the bearing portion of the second panel is curved and overlaps the bearing portion of the first panel.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
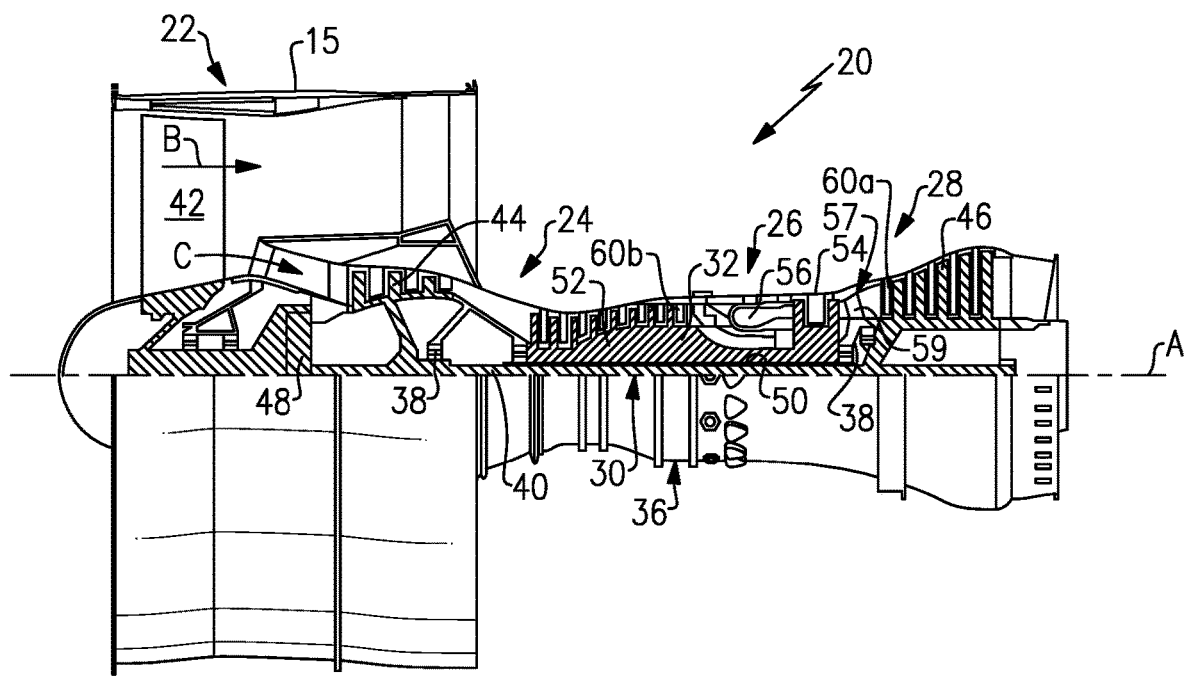
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

In gas turbine engines air is often bled from the compressor for cooling alloy components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

Figure 2A:
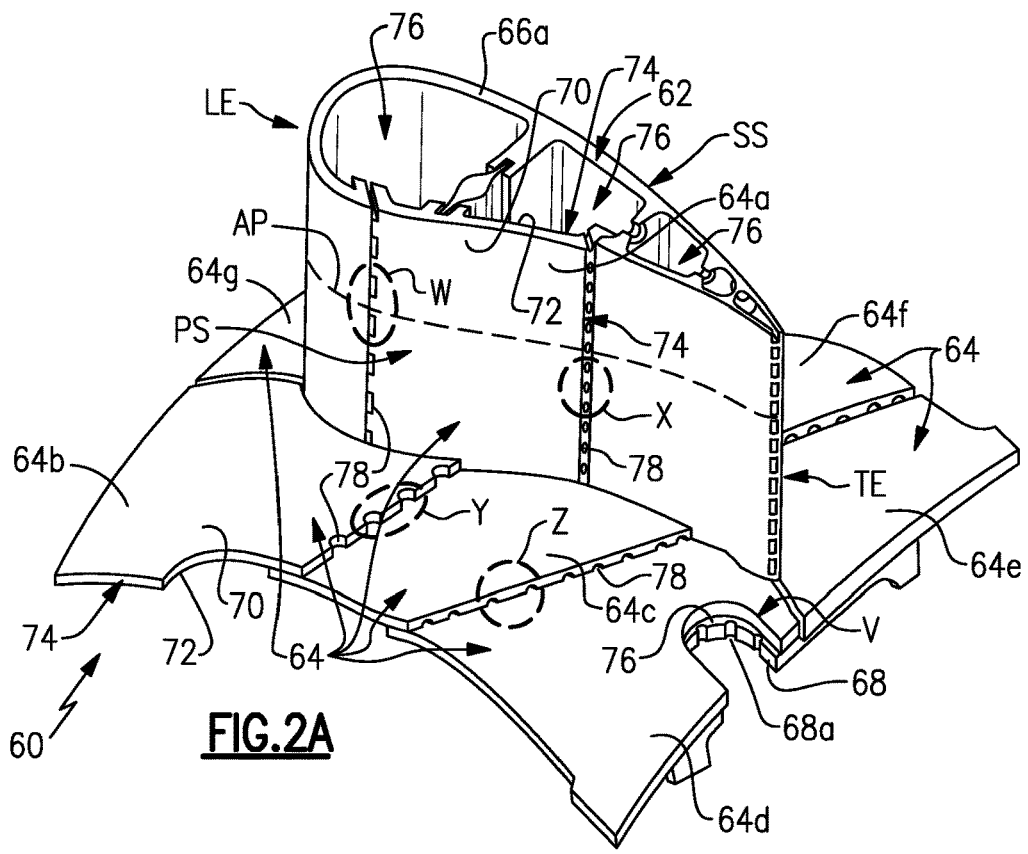
FIG. 2A illustrates an example article of the gas turbine engine; the article has a core structure and panels attached to the core structure.

FIG. 2A illustrates one such component, namely an article 60. In the illustrated example, the article 60 is an airfoil. For instance, the article 60 can be a turbine vane, as represented at 60*a* in FIG. 1, or a compressor vane, as represented at 60*b* in FIG. 1. As will be appreciated, although the examples herein are described in the context of a vane, this disclosure is not limited to vanes, and the examples may also be applicable to blades, other airfoils, or other articles that are exposed to high temperatures.

Figure 2B:
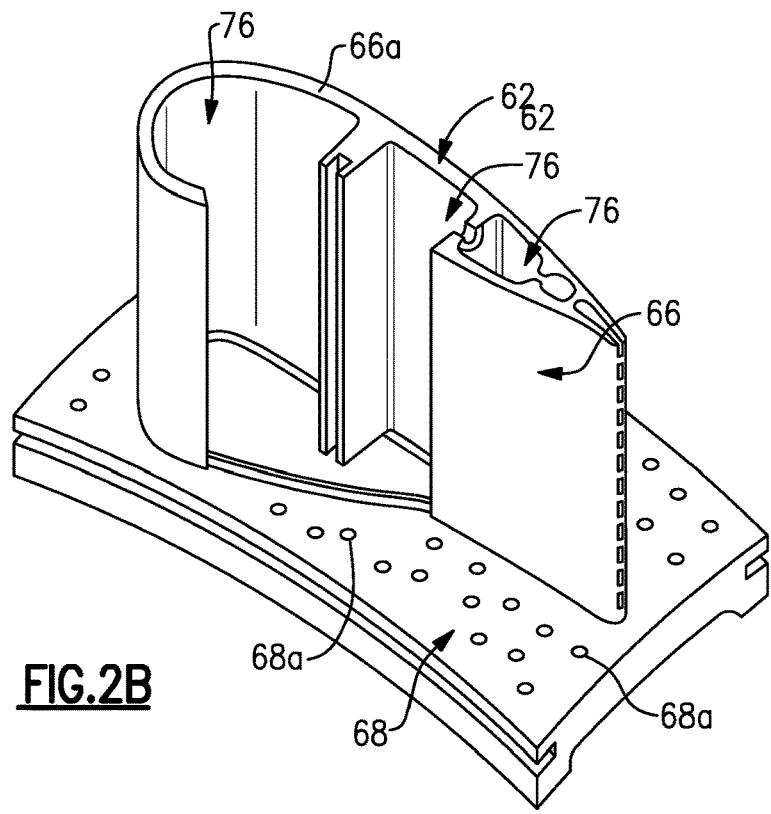
FIG. 2B illustrates the core structure of the article of FIG. 2A, without the panels.

The article 60 includes a core structure 62 and a plurality of panels 64. The core structure 62 is also shown in an isolated view in FIG. 2B, without the panels 64. In this example, the core structure 62 generally includes an airfoil section 66 and an endwall section 68 from which the airfoil section 66 radially extends. The panels 64, which are individually designated 64a/64b/64c/64d/64e/64f/64g, are attached with the core structure 62. For example, the panels 64 may be mechanically fastened to the core structure 62 by, but not limited to, interlocking features on the core structure 62 and panels 64.

Each of the panels 64 generally includes an exterior gas path side 70, an opposed interior side 72, and side edges 74. The side edges 74 are the perimeter regions, not necessarily the terminal faces of the panels 64. As an example, each panel is a distinct piece such that the exterior gas path side 70, the opposed interior side 72, and the side edges 74 completely bound the panel 64.

In the illustrated example, the panel 64a is attached on the airfoil section 66 of the core structure 62 and the remaining panels 64b/64c/64d/64e/64f/64g are attached on the platform section 68 of the core structure 62. Although designated differently, panels 64b and 64g are identical, panels 64c and 64f are identical, and panels 64d and 64e are identical. That is, the side edges of each of the panels 64b/64c/64d is contoured to fit with the next adjacent airfoil section. The airfoil section 66 of the core structure 62 includes one or more walls 66a. The wall or walls 66a and the panel 64a define at least a portion of an airfoil profile (AP), which is the peripheral shape when viewed in a radial direction. For example, the airfoil profile (AP) has a wing-like shape that provides a reaction force via Bernoulli's principle.

The airfoil profile (AP) generally includes a leading end (LE), a trailing end (TE), a pressure side (PS), and a suction side (SS). For example, the leading end (LE) is the region of the airfoil profile (AP) that includes a leading edge of the airfoil profile (AP). The leading edge may be the portion of the airfoil profile (AP) that first contacts air or the foremost edge of the airfoil profile (AP). For a variable vane, the leading edge may shift, depending on the orientation of the vane. In the illustrated example, the wall or walls 66a of the core structure 62 form the leading end (LE), the trailing end (TE), and the suction side (SS), and the panel 64a forms the pressure side (PS) or a portion thereof. As will be appreciated, the panel 64a could alternatively form a different portion of the airfoil profile (AP), or an additional panel or panels could be used to form other portions of the airfoil profile (AP).

The article 60 includes one or more coolant passages 76. For example, the airfoil section 66 of the core structure 62 may define, at least in part, one or more of the coolant passages 76. Additionally or alternatively, the article 60 may include one or more coolant passages 76 defined between one or more of the panels 64 and the core structure 62. For instance, a portion of the panel 64d is cutaway at region "V." The panel 64d is spaced from the endwall section 68, and the coolant passage 76 extends between the panel 64d and the endwall section 68. The end wall section 68 includes one or more cooling holes 68a. Coolant bleed air can be provided to the coolant passage or passages 76, to facilitate thermal management of the core structure 62 and the panels 64. The coolant bleed air can be discharged from the cooling holes 68a to impinge on the interior side 72 of the panel of panels 64.

The article 60 also includes one or more channels 78 that are configured to receive cooling bleed air from one of the passages 76 and discharge the cooling bleed air at the side edges 74 for cooling the exterior sides 70 of the panels 64 or an exterior side 67 of the wall 66a. One or more of the channels 78 may be provided in interfaces, which are generally designated as interfaces W, X, Y, and Z. Interface W is an interface between a forward portion of one of the panels 64 and the core structure 62. Interface X is an interface between a rear portion of one of the panels 64 and the core structure 62. Interfaces Y and Z are an interfaces between two of the panels 64. Thus, in each of the interfaces W/X/Y/Z, one of the panels 64 meets a mating component, which may be another panel 64 or the wall 66a. The following examples illustrate variations of the channel or channels 78 at the interfaces W/X/Y/Z. However, it is to be understood that the examples can be applied to different interfaces than described or shown, and that a single interface may include multiple examples of the channel or channels 78.

Figure 3:
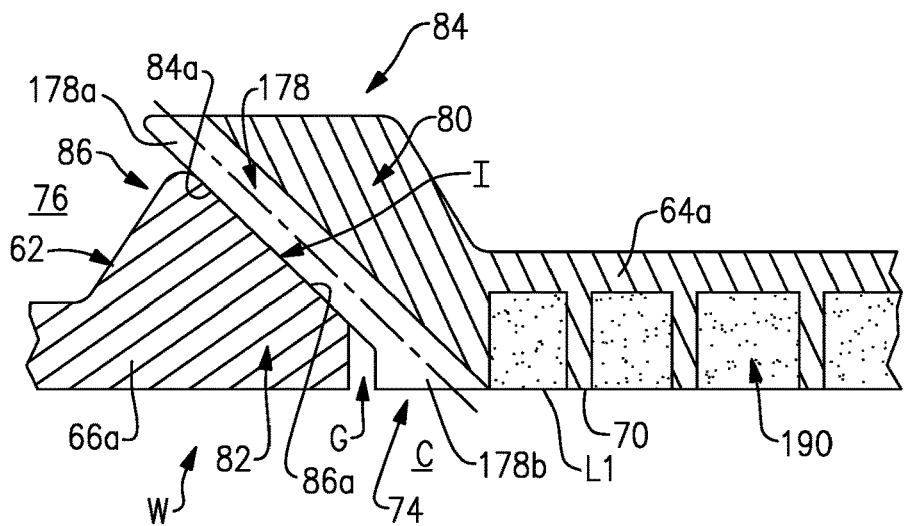
FIG. 3 illustrates an example interface between a panel and a mating component, where a channel extends through a bearing portion of the panel.

FIG. 3 illustrates a sectioned view through a representative portion of interface W between the panel 64a and the wall 66a of the core structure 62. The panel 64a includes a bearing portion 80 and the wall 66a includes a bearing portion 82. In this example, the bearing portion 80 includes or is a protrusion 84, and the bearing portion 82 includes or is a protrusion 86. The protrusions 84/86 respectively project from the main body portions of the panel 64a and wall 66a, which most typically will have a substantially uniform thickness.

The protrusions 84/86 include respective bearing surfaces 84a/86a, which are both sloped such that the bearing portions 80/82 of the panel 64a and the wall 66a overlap. The bearing surfaces 84a/86 abut each other. The region over which the bearing surfaces 84a/86a meet is a bearing interface (I), which slopes in accordance with the slope of the bearing surfaces 84a/86a. For instance, the bearing interface (I) is sloped with respect to a local portion of the exterior gas path side 70 of the panel 64a, such as at location L1. An expansion gap (G) may be provided between the wall 66a and the panel 64a to allow for thermal expansion differences.

In this example, channels 178 (one shown) extend through the bearing portion 80 of the panel 64a and, specifically, through the protrusion 84. In this disclosure, like reference numerals designate like elements where appropriate and reference numerals with the addition of one-hundred or multiples thereof designate modified elements that are understood to incorporate the same features and benefits of the corresponding elements. Each channel 178 has a first end 178a that opens to the coolant passage 76 and a second end 178b that opens to the exterior gas path side 70 at one of the side edges 74 of the panel 64a. In this example, the channels 178 are notches in the protrusion 84. The notches are open at the bearing interface (I). Thus, the protrusion 84 defines one or more of the sides of the channel 178 and the bearing surface 86a of the protrusion 86 forms a side of the channel 178. As will be appreciated, the number of notches and the size of the notches of any of the examples herein may be varied to meet cooling requirements.

The channel 178 receives cooling bleed air from the coolant passage 76 through the first end 178a. The channel 178 conveys the cooling bleed air through the protrusion 84 and discharges the cooling bleed air into the core gas path C. The channel 178 is sloped with the direction of flow in the core gas path C. In this example, the discharged cooling bleed air flows over at least a portion of the exterior side 70 of the panel 64a at the side edge 74. Of course, although the cooling bleed air is discharged from the second end 178b that opens to the exterior gas path side 70 at one of the side edges 74, depending on the configuration the cooling bleed air may flow over the exterior sides of other panels 64 or exterior side 67 of wall 66a.

Figure 4A:
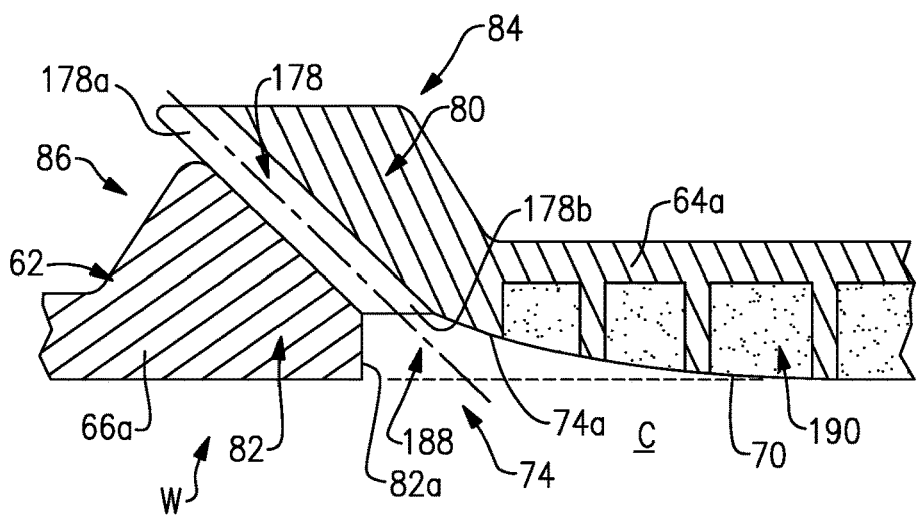
FIG. 4A illustrates an example interface between a panel and a mating component, where a channel extends through a bearing portion of the panel and opens into a recess.

FIG. 4A illustrates another example that is similar to FIG. 3 except that the channel 178 opens to an alcove or recess 188 (inside the dashed line) at the side edge 74 of the panel 64a. In this example, the recess 188 is defined by a face 82a of the bearing portion 82 of the wall 66a and an indentation 74a at the side edge 74. The indentation 74a is ramped and blends into the exterior side 70 of the panel 64a. The cooling bleed air discharges from the second opening 178b of the channel 178 into the recess 188. The recess 188 diffuses and slows the cooling bleed air, giving the flow time to adhere to the exterior side 70 prior to direct exposure in the core gas path C.

Figure 4B:
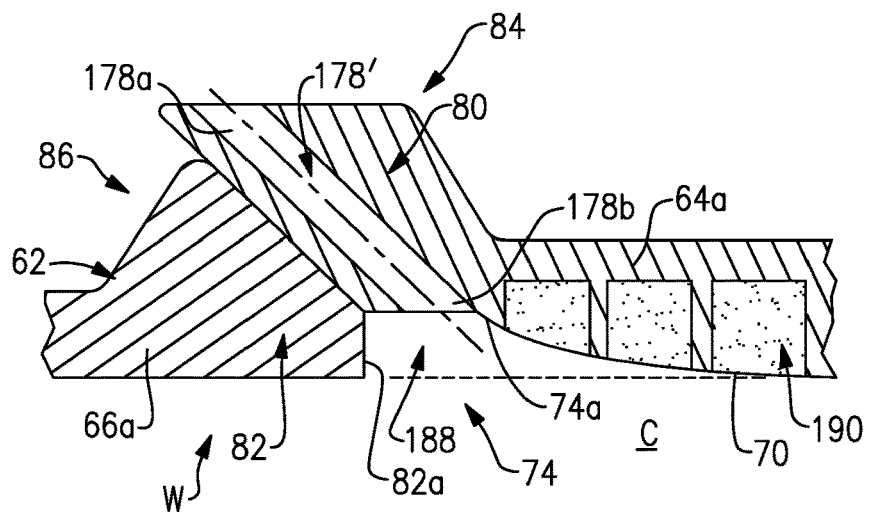
FIG. 4B illustrates a modified example of the interface of FIG. 4A, except that the channels are holes that extend through the bearing portion of the panel.

FIG. 4B illustrates a modified example except that the channels 178' are holes in the bearing portion 82 rather than notches as in FIG. 4A. The holes are thus completely or substantially completely formed by the bearing portion 82. As will be appreciated, the number of holes and the size of the holes of any of the examples herein may be varied to meet cooling requirements.

Figure 5:
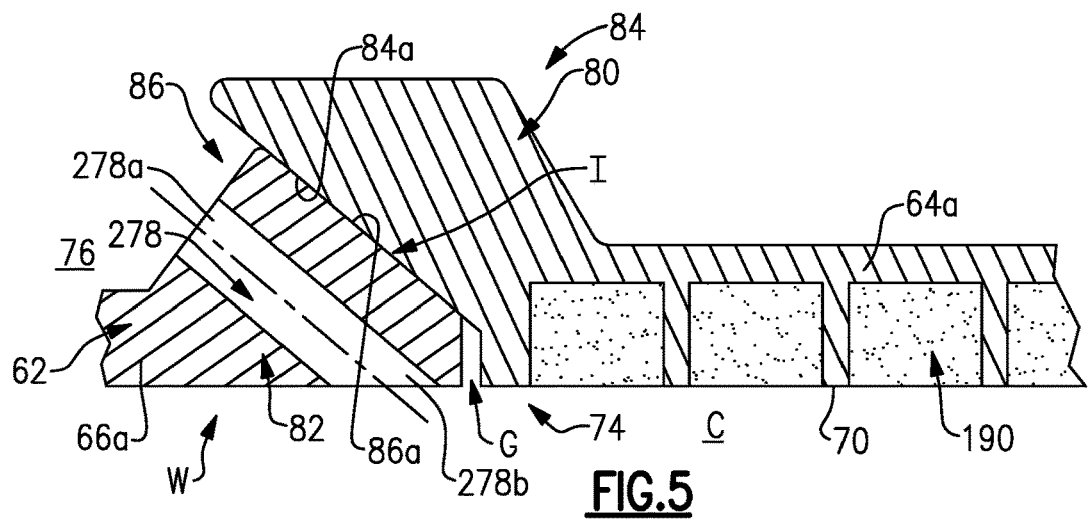
FIG. 5 illustrates an example interface between a panel and a mating component, where a channel extends through a bearing portion of the mating component.

FIG. 5 illustrates a sectioned view through another example of the interface W between the panel 64a and the wall 66a of the core structure 62. In this example, the channels 278 (one shown) extend through the bearing portion 82 of the wall 66a and, specifically, through the protrusion 86. Here, the channels 278 are holes in the bearing portion 82. The holes are thus completely or substantially completely formed by the bearing portion 82. As will be appreciated, the number of holes and the size of the holes of any of the examples herein may be varied to meet cooling requirements. Each channel 278 has a first end 278a that opens to the coolant passage 76 and a second end 278b that opens to the exterior gas path side 70 at one of the side edges 74 of the panel 64a.

Figure 6:
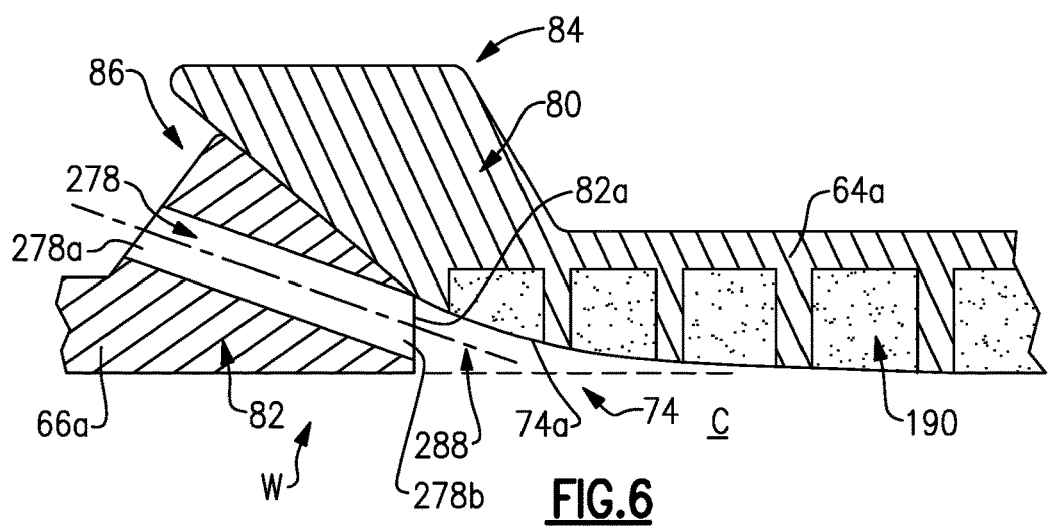
FIG. 6 illustrates an example interface between a panel and a mating component, where a channel extends through a bearing portion of the mating component and opens into a recess.

FIG. 6 illustrates another example that is similar to FIG. 5 except that the channel 278 opens to an alcove or recess 288 (inside the dashed line) at the side edge 74 of the panel 64a. In this example, the recess 288 is defined by a face 82a of the bearing portion 82 of the wall 66a and an indentation 74a at the side edge 74. The second end 278b of the channel 278 opens through the face 82a.

Figure 7:
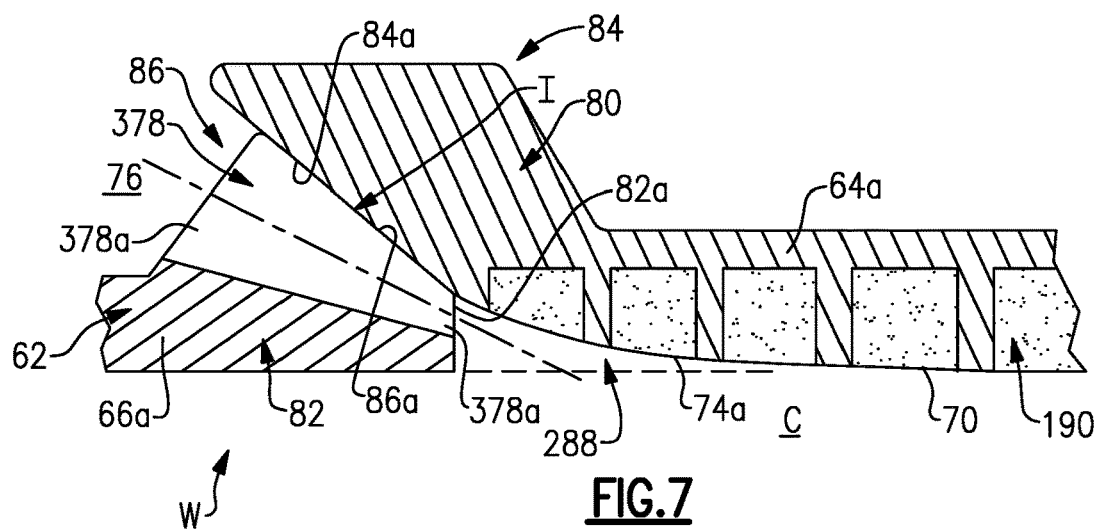
FIG. 7 illustrates an example interface between a panel and a mating component, where a channel extends through a bearing portion of the mating component and opens into a recess.

FIG. 7 illustrates another example that is similar to FIG. 6 except that the channels 378 (one shown) are notches in the protrusion 86. The notches are open at the bearing interface (I). Thus, the protrusion 86 defines one or more of the sides of the channel 378 and the bearing surface 84a of the protrusion 84 forms a side of the channel 378. The first end 378a of the channel 378 opens to the coolant passage 76 and the second end 378b of the channel 378 opens through the face 82a to the recess 288 at the side edge 74 of the panel 64a.

Figure 8:
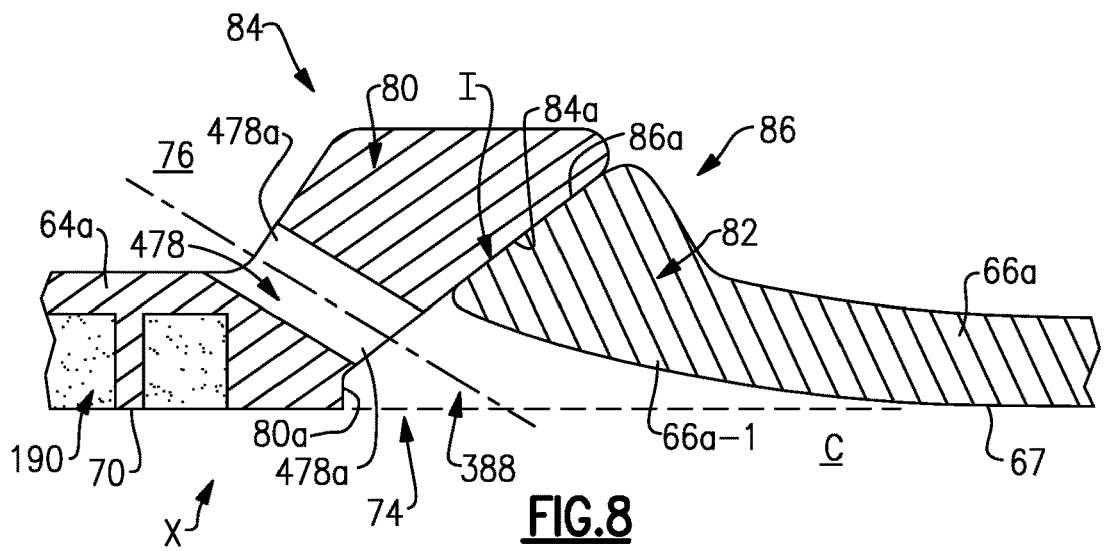
FIG. 8 illustrates an example interface between a panel and a mating component, where a channel extends through a bearing portion of the panel and opens into a recess.

FIG. 8 illustrates an example of the interface X, which is similar to FIG. 6 except that the positions of the panel 64a and wall 66a are flipped because the interface X is at the rear side of the panel 64a (rather than the interface W at the forward side of the panel 64a). In this configuration, the cooling bleed air is discharged to cool the exterior side 67 of the wall 66a. The channel 478 extends through the bearing portion 80 of the panel 64a and, specifically, through the protrusion 84. The first end 478a of the channel 478 opens to the coolant passage 76 and the second end 478b opens to the exterior gas path side 70 at the side edge 74 of the panel 64a. Here, the channel 478 opens into the recess 388 (inside the dashed line). In this configuration, the recess 388 is defined by a rear face 80a of the bearing portion 80 and an indentation 66a-1 at the side edge of the wall 66a.

The channel 478 receives cooling bleed air from the coolant passage 76 through the first end 478a. The channel 478 conveys the cooling bleed air through the protrusion 84 and discharges the cooling bleed air into the recess 388. The channel 478 is sloped with the direction of flow in the core gas path C. The recess 388 diffuses and slows the cooling bleed air, giving the air time to adhere to the exterior side 67 of the wall 66a prior to direct exposure in the core gas path C.

Figure 9:
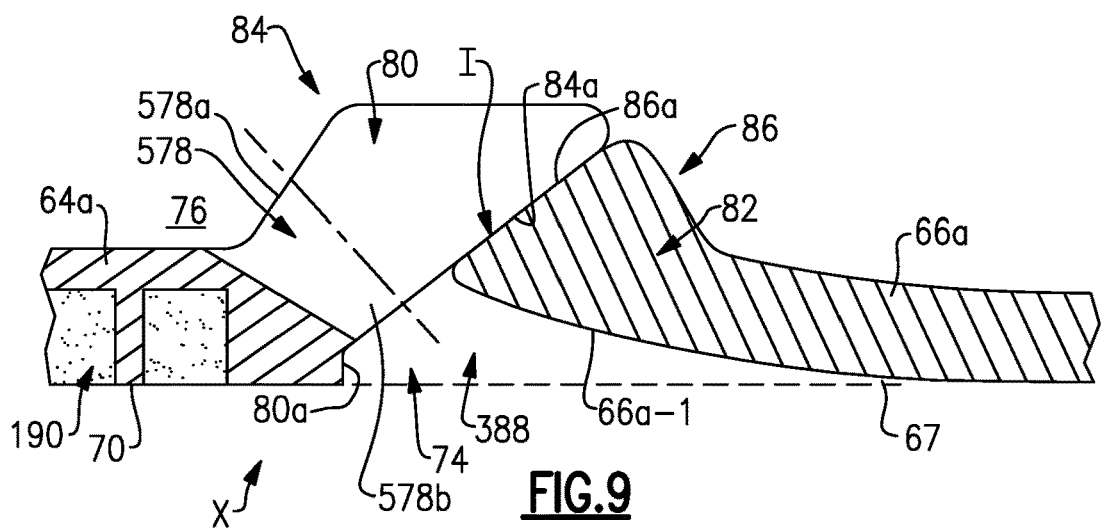
FIG. 9 illustrates an example interface between a panel and a mating component, where a channel extends through a bearing portion of the panel and opens into a recess.

FIG. 9 illustrates another example that is similar to FIG. 8 except that the channels 578 (one shown) are notches in the protrusion 84. The notches are open at the bearing interface (I). Thus, the protrusion 84 defines one or more of the sides of the channel 578 and the bearing surface 86a of the protrusion 86 forms a side of the channel 578. The first end 578a of the channel 578 opens to the coolant passage 76 and the second end 578b of the channel 578 opens to the exterior gas path side 70 at the side edge 74 of the panel 64a. Here, the channel 578 opens through the face 80a to the recess 388 at the side edge of the wall 66a.

Figure 10:
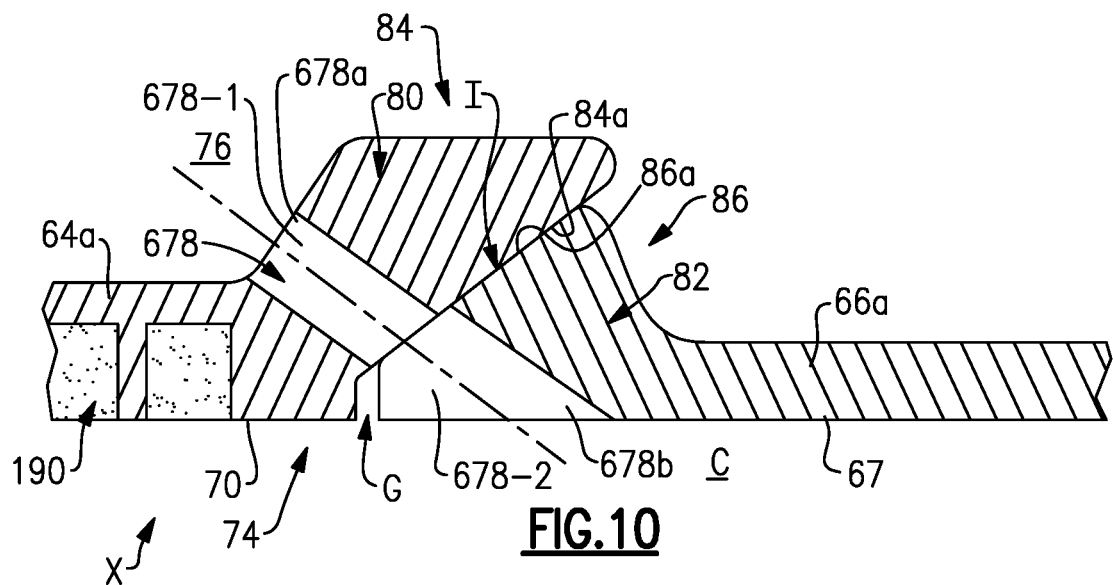
FIG. 10 illustrates an example interface between a panel and a mating component, where a channel extends through a bearing portion of the panel and a bearing portion of the mating component.

FIG. 10 illustrates another example of interface X which is a hybrid configuration. In this example, the channel 678 includes a first channel section 678-1 that extends through the protrusion 84 of the panel 64a and a second channel section 678-2 that extends through the protrusion 86 of the wall 66a. The first channel section 678-1 includes the first end 678a that opens to the coolant passage 76, and the second channel section 678-2 includes the second end 678b that opens to the exterior gas path side 70 at the side edge 74 of the panel 64a.

Figure 11:
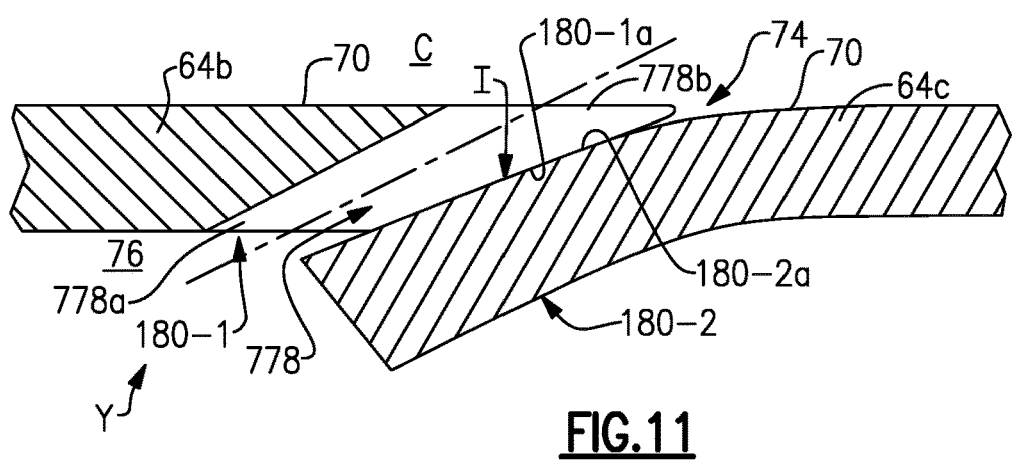
FIG. 11 illustrates an example interface between a panel and a mating component that is another panel.

FIG. 11 illustrates a sectioned view through a representative portion of interface Y between the panel 64b and the panel 64c. The panel 64b includes a bearing portion 180-1 and the panel 64c includes a bearing portion 180-2. In this example, the bearing portions 180-1/180-2 do not include protrusions. The bearing portions 180-1/180-2 include respective bearing surfaces 180-1a/180-2a that abut each other over a bearing interface (I). In this example, channels 778 (one shown) extend through the bearing portion 180-1 of the panel 64b. Each channel 778 has a first end 778a that opens to the coolant passage 76 and a second end 778b that opens to the exterior gas path side 70 at the side edge 74 of the panel 64c. In this example, the channels 778 are notches in the bearing portion 180-1. The notches are open at the bearing interface (I). Thus, the bearing portion 180-1 defines one or more of the sides of the channel 778 and the bearing surface 180-2a of the bearing portion 180-2 forms a side of the channel 778.

The channel 778 receives cooling bleed air from the coolant passage 76 through the first end 678a. The channel 778 conveys the cooling bleed air through the bearing portion 180-1 and discharges the cooling bleed air into the core gas path C. The channel 778 is sloped with the direction of flow in the core gas path C. The discharged cooling bleed air flows over at least a portion of the exterior side 70 of the panel 64c at the side edge 74. The interface Z may be configured similar to FIG. 10, except with panels 64c/64d.

The core structure 62 may be metal, such as a nickel alloy, cobalt alloy, a nickel alloy coated with cobalt or cobalt alloy, or a non-nickel alloy that does not react with ceramic. One or more of the panels 64 may be formed of ceramic, to provide thermal and/or environmental resistance. The ceramic may include, but is not limited to, oxides, carbides, nitrides, borides, silicides, and combinations thereof. A ceramic is a compound of metallic or metalloid elements bonded with nonmetallic elements or metalloid elements primarily in ionic or covalent bonds. In further examples, the ceramic is a monolithic ceramic or a ceramic matrix composite (CMC). For example, a monolithic ceramic is composed of a single, homogenous ceramic material. In comparison, a composite is composed of two or more materials that are individually easily distinguishable. A CMC has a reinforcement phase, such as ceramic or carbon fibers, dispersed in a ceramic matrix formed of oxides, carbides, nitrides, borides, silicides, or combinations thereof.

In another example, one or more of the panels 64 may be coated with a thermal and/or environmental barrier ceramic coating. As an example, the ceramic coating may include or may be oxides, carbides, nitrides, borides, silicides, or combinations thereof. In further examples, the ceramic coating may be or may include yttria stabilized with zirconia, hafnia, and/or gadolinia, gadolinia zirconate, molybdate, alumina, or combinations thereof.

Figure 12A:
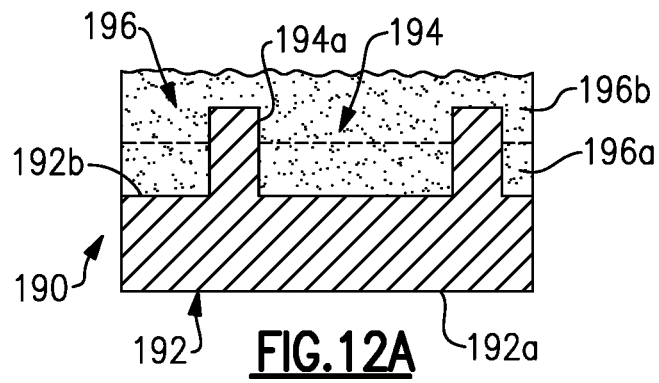
FIG. 12A illustrates a representative portion of a geometric segmented coating section.
Figure 12B:
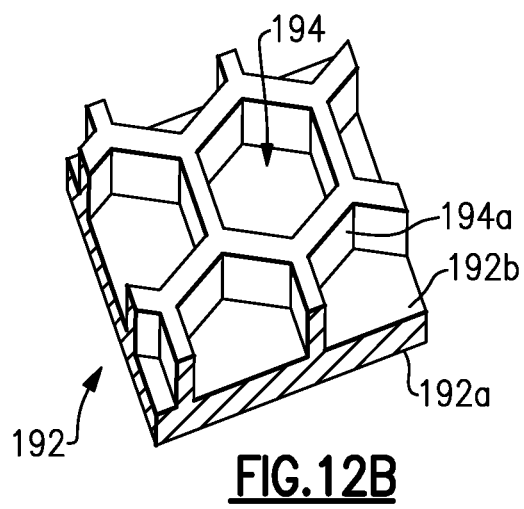
FIG. 12B illustrates a wall of the geometric segmented coating section, without the coating.

Additionally or alternatively, the core structure 62 and/or one or more of the panels 64 may include a geometric segmented coating section. For instance, FIG. 12A illustrates a representative portion of one of the panels 64 (or the core section 62) that includes a geometric segmented coating section 190, which is also depicted in part in several or the prior examples (FIGS. 3-9). The coating section 190 includes a metal wall 192. The metal wall 192 includes a first or inner side 192a and a second or exterior side 192b that is opposite the first side 192a. The exterior side 192b is also the exterior side exposed in the core gas path C. The second side 192b includes an array of cells 194 defined by cell sidewalls 194a. The array is a repeating geometric pattern of one or more cell geometries. In this example, the cell sidewalls 194a have a uniform thickness. As shown in the isolated view of the wall 192 in FIG. 12B, the cells 194 are hexagonal. Alternatively, the cells 194 may be circular, ovular, other polygonal geometry, or mixed cell geometries.

A coating 196 (FIG. 12A) is disposed in the array of cells 194. The cells 194 mechanically facilitate bonding of the coating 196 on the wall 192. The cells 194 thus provide good bonding and spallation resistance of the coating 196, particularly at higher temperature locations. In turn, greater spallation resistance may reduce the need for bleed air for cooling or enable use of higher temperature bleed air that is less of an efficiency penalty. The coating 196 may be a barrier coating, such as a thermal barrier or environmental barrier, which is formed of a ceramic material. The coating 196 may be a monolayer coating but more typically will be a multi-layer coating. For instance, the coating 196 has a first coating layer 196a and a second coating layer 196b. In this example, the second coating layer 196b is a topcoat.

The ceramic material of the coating 196 provides thermal and/or environmental resistance. As an example, the ceramic material may include or may be yttria stabilized with zirconia, hafnia, and/or gadolinia, gadolinia zirconate, molybdate, alumina, or combinations thereof. Additionally or alternatively, the ceramic material may include or may be a ceramic matrix composite which has a reinforcement phase, such as ceramic or carbon fibers, dispersed in a ceramic matrix formed of oxides, carbides, nitrides, borides, silicides, or combinations thereof.

The coating 196 may also include a bond coat for attaching the ceramic material to the wall 192 and cells 194. The wall 192 and cells 194 may be formed of an alloy. Example alloys may include, but are not limited to, nickel alloys, cobalt alloys, a nickel alloy coated with cobalt or cobalt alloy, or a non-nickel alloys that do not substantially react with ceramic. The bond coat may include a nickel alloy, platinum, gold, silver, or MCrAlY, where the M includes at least one of nickel, cobalt, iron, or combinations thereof.

The cell sidewalls 194a also facilitate reducing internal stresses in the coating 196 that may occur from sintering at relatively high surface temperatures during use in the engine 20. The sintering may result in partial melting, densification, and diffusional shrinkage of the coating 196 and thereby induce internal stresses. The cell sidewalls 194a serve to produce faults in at least the portion of the coating 196 above the cell sidewalls 194a. The faults provide locations for releasing energy associated with the internal stresses (e.g., reducing shear and radial stresses). That is, the energy associated with the internal stresses may be dissipated in the faults such that there is less energy available for causing delamination cracking between the coating 196 and the underlying wall 192.

The coating section 190 may be formed using several different fabrication techniques. As an example, the wall 192 may be fabricated by investment casting, additive manufacturing, brazing, or combinations thereof, but is not limited to such techniques. For instance, the cells 194 can be separately fabricated and brazed to the remaining portion of the wall 192, which can be investment cast or additively fabricated. Alternatively, the cells 194 can be formed by other techniques, such as depositing an alloy coating and removing sections of the alloy coating by machining, electro-discharge machining (EDM), or other removal process.

To produce the coating 196, ceramic coating material is deposited in the cells 194. The deposition process can include, but is not limited to, plasma spray or physical vapor deposition. In one example, plasma spray is used to produce a more durable version of the coating 196. For instance, the coating 196 has a laminar microstructure. The laminar microstructure includes grains of ceramic material that have a high aspect ratio. The laminar microstructure is a product of the plasma spray process, in which droplets of melted or partially melted ceramic material are sprayed onto the cells 194. Upon impact, the droplets flatten and solidify, yielding the laminar microstructure. There may be voids or pores among the grains; however, the coating 196 is substantially fully dense. For instance, the coating 196 has a porosity of less than 15%.

The ceramic coating material fills or substantially fills the cells 194 and is deposited in a thickness that is greater than the height of the cell sidewalls 194a. At this stage, the surface of the coating may have contours from the underlying cells 194. If such contours are undesired, the surface may be machined, ground, or abraded flat. For instance, the surface is reduced down to or close to the tops of the cell sidewalls 194a.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:
1. An airfoil comprising:
   a core structure defining a cooling passage;
   first and second panels attached with the core structure, each of the first and second panels including an exterior gas path side, an opposed interior side, and a side edge, the side edge having a bearing portion that defines a bearing surface, the bearing surface of the first panel abutting the bearing surface of the second panel at a bearing interface; and channels in the bearing portion of the first panel, each of the channels having a first end opening to the cooling passage and a second end opening to the exterior gas path side at one of the side edges, and each of the channels being defined on a side by the bearing surface of the second panel.

2. The airfoil as recited in claim 1, wherein the channels are notches.

3. The airfoil as recited in claim 2, wherein each of the notches is elongated and sloped.

4. The airfoil as recited in claim 1, wherein the first and second panels overlap at the bearing interface.

5. The airfoil as recited in claim 1, wherein the airfoil includes an airfoil section and a platform, and the first and second panels are on the platform.

6. The airfoil as recited in claim 5, wherein the channels are notches and each of the notches is elongated and sloped.

7. The airfoil as recited in claim 6, wherein the first and second panels overlap at the bearing interface.

8. The airfoil as recited in claim 7, wherein at least one of the first or second panels includes a geometric segmented coating section.

9. The airfoil as recited in claim 5 wherein the first and second panels each include a side that is contoured to a shape of a portion of the airfoil section.

10. The airfoil as recited in claim 1, wherein the bearing portion of the second panel is curved and overlaps the bearing portion of the first panel.

* * * * *